3,479,266
INORGANIC ION EXCHANGE MEMBRANES FOR USE IN ELECTRICAL SEPARATORY PROCESSES
Krishnaswamy S. Rajan, Chicago, Ill., and Angelo J. Casolo, Franklin, Mass., assignors to the United States of America as represented by the Secretary of the Interior
No Drawing. Filed Nov. 30, 1967, Ser. No. 686,796
Int. Cl. B01j 1/08; B01d 13/02; B01k 3/10
U.S. Cl. 204—180
8 Claims

ABSTRACT OF THE DISCLOSURE

Inorganic ion exchange membranes, suitable for use in electrical separatory processes such as transport depletion and electrodialysis, are prepared from a hydrous oxide of an element from the group of alkaline earth metals, the actinide series, the lanthanide series, aluminum, zirconium, chromium and tin.

Background of the invention

Electrical membrane separation processes in general take advantage of the differences in mobilities of various ions across a permselective membrane. The effect of such processes is to either concentrate or deplete particular ions in the bulk solution being treated. A wide variety of uses have been found for these processes; examples of which include removal of salts from brackish or saline water, recovery of spent acid solutions, recovery of pulping wastes, lowering of citric acid levels in fruit juices and the purification of colloidal suspensions.

Probably the most important single use of these processes has been the production of potable water by removing the minerals from brackish or saline water sources. Large numbers of organic permselective membranes have been developed for this purpose.

Results at government sponsored demonstration plants have shown that the single most important weakness in the demineralization of saline waters using electrical membrane processes has been the unreliability of organic ion-exchange membranes. These membranes tend to break down or become fouled in the presence of iron or detergents, are generally unstable to chemical attack or oxidation and show an accelerated rate of degradation with increasing temperature. This last deficiency is particularly troublesome because electrical membrane separatory processes proceed with much less resistance and greater efficiency at elevated temperatures.

Thus it is an object of this invention to provide an improved anion exchange membrane.

It is another object of this invention to provide an improved electrical membrane separatory process.

A further object of this invention is to provide an improved method of making anion exchange membranes.

Brief summary of the invention

The present invention comprises a process for separating electrolytes from their solutions by employing inorganic ion-exchange membranes having greater stability to high temperatures, chemical attack and fouling than do organic membranes customarily used in such processes. Membranes useful in this invention comprise a mixture of thorium hydrous oxide with a hydrous oxide of a second metal and these membranes are produced by co-precipitating a mixture of two metal salts together with a binder material followed by hydrolysis to form the hydrous oxide of the metals. The term hydroxide as used herein is synonymous with hydrous oxide.

Application of membranes to electrical separatory processes

Due to the ability of the membranes of this invention to remain stable at relatively high temperatures, to resist degradation and fouling and to remain stable under corrosive and oxidizing conditions, they have great utility in electrical membrane separatory processes; particularly in electrodialysis and transport depletion processes. These processes are well known in the art and have been extensively used to demineralize saline waters.

Transport depletion is the most basic of the electrically driven processes. In that process, demineralization depends upon the passage of ions through ion exchange membranes in which the ion transference numbers ($t+$ or $t-$) are different from their respective transference numbers in the solution being treated. Concentration gradients are established at the membrane face because the number of ions involved in carrying electrical current through the membranes is different from the number of ions carrying current through the solution. The ion-selective membranes within a transport depletion cell are all of one type; being either anionic or cationic. A typical cell configuration comprises a plurality of membranes disposed between two electrodes. Depletion occurs on the anode side of each membrane and concentration on the cathode side.

Electrodialysis is a similar membrane process in which a driving force of electric current is used to move ions through a solution. Advantage is taken of the selective properties of both anionic and cationic membranes to separate the contained electrolytes. A typical electrodialysis cell consists of alternate cationic and anionic membranes positioned in a spaced relationship between a pair of driving electrodes. When an electromotive force is applied, cations travel through the cation-permeable membranes toward the cathode and anions travel through the anion-permeable membranes toward the anode thereby forming alternate zones of enrichment and depletion.

Detailed description of the invention

Anion exchange membranes useful in the present invention comprise a mixture of thorium hydrous oxide with a hydrous oxide of an element chosen from the alkaline earths, the actinide series, the lanthanide series, aluminum, zirconium, chromium and tin. Particularly preferred members of this group comprise the hydrous oxides of magnesium, uranium, cerium and tin. The most preferred member is cerium.

Preparation of the co-precipitated hydrous oxide membranes of this invention involves first dissolving a hydrolyzable salt of thorium and hydrolyzable salt of the co-precipitating cation in a solvent together with a matric-forming or binder material. Any soluble hydrolyzable salt may be used but the nitrate is preferred because of its solubility and its general ease of hydrolysis.

The resulting mixture is then spread on a smooth surface, such as a glass plate, to form a uniform film of predetermined thickness. The film as cast conveniently ranges from about 5 to 5 mils in thickness. After casting the film, it is heated in order to drive off substantially all of the solvent. Heating temperature is not critical so long as it is not sufficiently high to damage the matrix or binder material. A temperature range of about 70 to 110° C. is preferred. After driving off the solvent, the resulting film is exposed to a hydrolyzing agent, preferably aqueous ammonium hydroxide, to form the hydrous oxides of the elements present.

Matrix-forming or binder materials which may be used include polytetrafluoroethylene, polyvinylidene fluoride, polyvinyl butyral and silicon based polymers. Polyvinylidene fluoride is particularly preferred because of its excellent thermal and chemical stability and its good mechanical properties. The binder material comprises from about 30 to 50% by weight of the finished membrane.

Any relatively volatile solvent which dissolves both the binder material and the hydrolyzable salts may be used in the process. Solvents found satisfactory for use include dimethyl formamide, dimethyl sulfoxide, dimethyl acetamide and the mono- and di-alkyl ethers of ethylene glycol. Concentration of binder materials in the solvent is not critical and may conveniently range from about 10 to 30%.

The weight ratio of thorium hydrous oxide to the co-precipitated metal hydrous oxide may range from about 20 to 1 to about 1 to 1. Some variation of electrical properties occurs as the ratio of the two hydrous oxides change. A ratio of about 5 to 1 has been found to be particularly useful.

Example

Inorganic anion exchange membranes were prepared by co-precipitating the hydrous oxide of thorium with each of the hydrous oxides of magnesium, calcium, uranium, each aluminum, chromium, zirconium, cerium, and tin. In each case, the procedure was as follows:

Ten parts by weight of thorium nitrate and 2 parts by weight of the co-precipitating cation as the nitrate salt were dissolved in 10 parts by weight of dimethyl formamide by heating to 90° C. To this solution was added 15 parts by weight of a 20% solution of polyvinylidene fluoride in dimethyl acetamide. The resulting mixture was cast while hot into a film of 25 mils thickness on a glass plate. The film was dried in an oven at 90° C. for 2 hours in order to drive off substantially all of the solvent. After drying, the film was hydrolyzed in a 10% aqueous solution of ammonium hydroxide in order to form the hydrous oxides of the co-precipitated metals. Electrical properties of the membranes thus formed are set out in the following table:

TABLE.—ELECTRICAL PROPERTIES

| Membrane | Resistance ohm, cm.$^2$ | Transference No. (0.05–0.10 M KCl) |
|---|---|---|
| Thorium-calcium hydrous oxide | 3.0 | 0.88 |
| Thorium-magnesium hydrous oxide | 2.5 | .90 |
| Thorium-uranium hydrous oxide | 2.5 | .87 |
| Thorium-aluminum hydrous oxide | 3.0 | .82 |
| Thorium-chromium hydrous oxide | 3.5 | .86 |
| Thorium-zirconium hydrous oxide | 3.0 | .86 |
| Thorium-cerium hydrous oxide | 2.0 | .93 |
| Thorium-tin hydrous oxide | 2.5 | .90 |

Eelectrical resistances of the membranes were determined by measurement using a conductance bridge and a standard cell having a cross section area of 5 cm.$^2$. The procedure consisted of placing the equilibrium membrane in the cell, filling the cell with 0.5 M NaCl and measuring the resistance with the conductance bridge. Membrane resistance was taken as the difference in cell resistance with and without the membrane.

Membrane transference numbers reported are the transference numbers of chloride ions through each membrane. They were determined by the procedure described in "Office of Saline Water Test Manual for Permselective Membranes" found in OSW Research and Development Progress Report No. 77 (1964).

The membranes were found to have good stability when used in the electrodialysis of a sodium chloride brine at 60° C. and were non-fouling when exposed to low concentrations of dodecyl benzene sulfonate.

While the above examples are illustrative of the membranes and processes of the present invention, they are not to be interpreted as limiting. It will be apparent to those skilled in the art that various adaptations and modifications of the invention as decsribed herein are possible without departing from its spirit and scope.

What is claimed is:

1. An anion exchange membrane consisting essentially of thorium hydrous oxide and a second hydrous oxide of an element chosen from the group consisting of the alkaline earths, the actinide series, the lanthanide series, aluminum, zirconium, chromium and tin, the weight ratio of thorium hydrous oxide to said second hydrous oxide being in the range of about 20 to 1 to about 1 to 1, together with a binder material chosen from the group consisting of polyvinylidene fluoride, polytetrafluoroethylene and polyvinyl butyral, said binder material comprising about 5 to 50% by weight of the membrane.

2. The membrane of claim 1 wherein said element is chosen from the group consisting of magnesium, calcium, uranium, aluminum, chromium, zirconium, cerium, and tin and wherein said binder material is polyvinylidene fluoride.

3. The membrane of claim 2 wherein said element is cerium and wherein said weight ratio of thorium hydrous oxide to cerium hydrous oxide is about 5 to 1.

4. The membrane of claim 2 wherein said element is tin and wherein said weight ratio of thorium hydrous oxide to tin hydrous oxide is about 5 to 1.

5. The membrane of claim 2 wherein said element is magnesium and wherein said weight ratio of thorium hydrous oxide to magnesium hydrous ovide is about 5 to 1.

6. In a process wherein the concentration of ions in a solution is altered by selective passage of a portion of said ions through an ion exchange membrane under an electrical driving force, the improvement comprising utilizing as said ion exchange membrane a material consisting essentially of thorium hydrous oxide and a second hydrous oxide of an element chosen from the group consisting of the alkaline earths, the actinide series, the lanthanide series, aluminum, zirconium, chromium and tin, the weight ratio of thorium hydrous oxide to said second hydrous oxide being in the range of about 20 to 1 to about 1 to 1, together with a binder material chosen from the group consisting of polyvinylidene fluoride, polytetrafluoroethylene and polyvinyl butyral, said binder material comprising about 30 to 50% by weight of the membrane.

7. The process of claim 6 wherein said concentration is altered by electrodialysis.

8. The process of claim 6 wherein said concentration is altered by transport depletion.

References Cited

UNITED STATES PATENTS

| 3,056,647 | 10/1962 | Amphlett | 23—14.5 |
| 3,276,910 | 10/1966 | Grasselli et al. | 136—86 |
| 3,309,233 | 3/1967 | McPheeters et al. | 136—153 |
| 3,346,422 | 10/1967 | Berger | 136—148 |
| 3,350,230 | 10/1967 | Tannenberger et al. | 136—86 |

JOHN H. MACK, Primary Examiner

A. C. PRESCOTT, Assistant Examiner

U.S. Cl. X.R.

136—153; 204—295, 301